United States Patent [19]

Kawasaki et al.

[11] Patent Number: 4,669,632

[45] Date of Patent: Jun. 2, 1987

[54] EVACUATED HEAT INSULATION UNIT

[75] Inventors: Tamotsu Kawasaki, Yokohama; Takeshi Kuwana, Tokyo; Minoru Morita, Yokohama, all of Japan

[73] Assignee: Nippon Sanso Kabushiki Kaisha, Tokyo, Japan

[21] Appl. No.: 804,198

[22] Filed: Dec. 3, 1985

[30] Foreign Application Priority Data

Dec. 4, 1984 [JP] Japan .......................... 59-184058[U]
Nov. 21, 1985 [JP] Japan .......................... 60-179380[U]

[51] Int. Cl.$^4$ .............................................. B65D 75/30
[52] U.S. Cl. .................................... 220/423; 428/172; 428/461; 428/35; 428/69; 220/444; 220/450
[58] Field of Search ............... 220/423, 444, 456, 450, 220/464; 383/113, 116; 428/69, 172, 457, 461, 35

[56] References Cited

U.S. PATENT DOCUMENTS

| | | | |
|---|---|---|---|
| 2,774,066 | 1/1957 | Gaugler et al. .................. | 428/69 |
| 2,934,811 | 6/1960 | Dillon ............................ | 428/69 |
| 3,307,318 | 3/1967 | Bauman .......................... | 220/444 |
| 4,269,323 | 5/1981 | Ito et al. ......................... | 428/172 |
| 4,529,638 | 7/1985 | Yamamoto et al. ............. | 428/69 |
| 4,581,285 | 4/1986 | Mahefkey, Jr. ................. | 220/450 |

FOREIGN PATENT DOCUMENTS 0146993 8/1984 Japan .................................. 428/69

Primary Examiner—John E. Kittle
Assistant Examiner—James J. Seidleck
Attorney, Agent, or Firm—Armstrong, Nikaido, Marmelstein & Kubovcik

[57] ABSTRACT

A plate like insulation unit which includes an evacuated bag having two gas impermeable films sealed at peripheries thereof to form the bag and a heat insulating core material charged into the bag. The one gas impermeable film of the bag is a first film having a first metallic foil laminated to extend to the peripheries thereof, and the other gas permeable film is a second film having a metallic layer vapor deposited.

5 Claims, 10 Drawing Figures

EVACUATED HEAT INSULATION UNIT

BACKGROUND OF THE INVENTION

The present invention relates to an evacuated heat insulation unit (hereinafter referred to as insulation unit) for use in, for example, refrigerators as a heat insulation panel.

The insulation unit for use in refrigerators has a synthetic resin bag charged with a heat insulation core material, such as a foamed and then crashed fine perlite powder, in a vacuum state. The evacuated insulation unit has a high heat insulating property or a low thermal conductivity of about 0.01 Kcal/m.h oc or less since it includes a heat insulation vacuum layer. However, the evacuated insulation unit is degraded in its heat insulating property with lapse of time since a small amount of air permeates through the plastic bag into the evacuated insulation unit.

When the opposite films of the insulation bag are made of a metallic foil, the evacuated heat insulation bag is excellent in vacuum degree retention since a metallic foil allows only a trace amount of gas to permeate it and hence the insulation unit has a prolonged life. However, the metallic foils of the insulation unit constitute at the sealed peripheries a heat bridge between the outer face and the inner face of the insulation unit, and hence heat conductivity at the peripheries of the insulation unit is rather large, resulting in deterioration in insulation property of the whole insulation unit.

To avoid this, an attempt has been made to form a bag for the insulation unit with plastic films, made of a polyethylene, polyester, etc, and vapor deposited with a metal such as aluminum. However, this metallized film bag allows small gas permeation and hence the life of the insulation unit using this bag is not sufficient.

A further attempt has been made to prolong the life of the insulation unit by the use of a bag using a metallic foil laminated plastic film. Although this metallic foil laminated bag ensures a fairly long life of the insulation unit, there arises the same heat bridge problem as in the metal foil bag previously mentioned. It was noted that in a 500×500×20 mm insulation unit using a laminated film bag laminated with a 20 μm aluminum foil, heat which passes through the peripheries thereof was about five to ten times in quantity as large as heat which passes through a planar portion surrounded by the peripheries. There is a tendency that the smaller the insulation unit, the larger this phenomenon.

SUMMARY OF THE INVENTION

Accordingly, it is an object of the present invention to provide an evacuated heat insulation unit which is fairly low in heat conductivity at the peripheral portion thereof, thus providing excellent heat insulation property.

It is another object of the present invention to provide an evacuated heat insulation unit which is excellent in vacuum degree retention property, thereby ensuring a fairly long period of life.

With these and other objects in view the present invention provides a plate like insulation unit which includes an evacuated bag having two gas impermeable films sealed at peripheries thereof to form the bag and a heat insulating core material charged into the bag. The one gas impermeable film of the bag is a first film having a first metallic foil laminated to extend to the peripheries thereof, and the other gas impermeable film is a second film having a metallic layer vapor deposited thereon.

BRIEF DESCRIPTION OF THE INVENTION

DETAILED DESCRIPTION OF THE PREFERRED EMBODIMENTS

Figure 2:
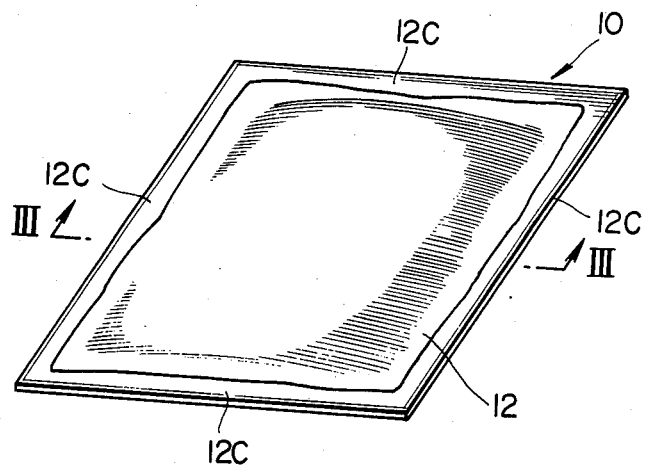
FIG. 2 is a perspective view of the insulation unit using the bag in FIG. 1.
Figure 3:
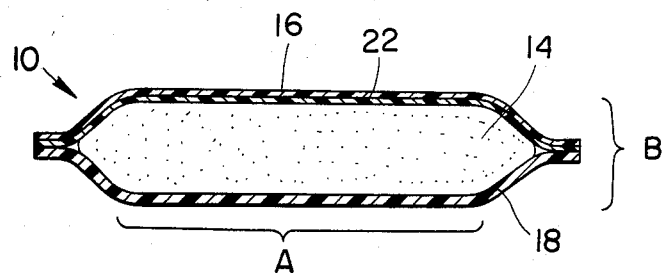
FIG. 3 is a cross-sectional view of the insulation unit along the line III—III in FIG. 2 with a modified scale for illustration purpose.

In FIGS. 2 and 3, the reference numeral 10 designates an evacuated heat insulation panel including a vacuum packed bag 12 and a heat insulating core material 14 charged into it. The heat insulating core material 14 may include: a fine powder such as a finely crashed perlite and a microballoon; an inorganic material powder such as silica, magnesium carbonate, a diatomaceous earth and calcium silicate; a moulding of calcium silicate; a fine glass fiber; asbestos; a heat insulating material such as a foamed plastic material; and like insulating materials. The vacuum packed bag 12 has two films 16 and 18 heat sealed at their peripheries 12A, and includes a planar portion A and a peripheral portion B surrounding the planar portion A.

Figure 4:
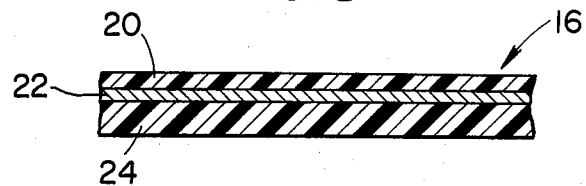
FIG. 4 is an enlarged cross-sectional view of part of the metallic foil laminated film in FIG. 3.
Figure 5:
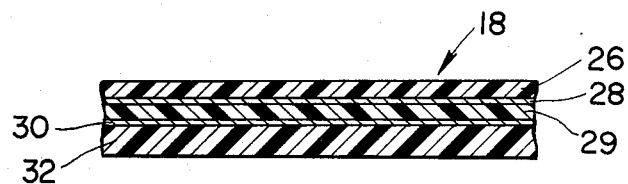
FIG. 5 is an enlarged cross-sectional view of part of the aluminum vapor-deposited film in FIG. 3.

The film 16 is, as shown in FIG. 4, a laminated film including an outer layer 20 of a synthetic resin, an intermediate layer 22 of a metallic foil laminated to the outer layer 20 and an inner layer 24 of a synthetic resin. The outer layer 20 is a polyethylene film (hereinafter referred to as PE film), polyethylene terephthalate (hereinafter as PET), nylon film, polyvinylidene chloride film, biaxially oriented polypropylene film or a film of a similar resin. The outer layer typically has a thickness about 12 μm to 25 μm. The inner layer film 24 may be made of, for example, a polyolefin resin such as a low density polyethylene (hereinafter as LDPE), high density polyethylene (HDPE) and polypropylene (PP). The inner layer typically has a thickness 30 μm to 100 μm and may be made of LDPE, HDPE, PP and a like material. The outer and inner layers 20 and 24 may be a film vapor-deposited with a metal such as aluminum. The metallic foil 22 may be made of aluminum, iron, stainless steel, tin or a similar material. When an aluminum foil is used, the metallic foil 22 has typically a thickness about 9 μm to about 30 μm. The metallic foil 22 may be provided to either the outer face or the inner face of the film 16. As illustrated in FIG. 3, the metallic foil 22 is provided to reach the same extent as the layers 20 and 24. The metallic foil 22 may be laminated to the outer and inner layers 20 and 24 by means of conventional dry laminating, wet laminating, heat sealing or other similar processing.

The other film 18 is a laminated film including, for example, an outermost PET film layer 26 having a first aluminum layer 28 vapor deposited thereon, an intermediate PET film layer 29 having a second aluminum layer 30 vapor deposited and an innermost PE film layer 32. The outermost and intermediate layers 26 and 29 typically has a thickness about 12 to 25 $\mu m$ and may be made of the same material as the inner layer 20 of the film 16 in FIG. 4. The innermost layer 32 may be made of the same material as the lower layer 24 of the film 16 in FIG. 4 and may have a thickness equal to the thickness of the lower layer 24. Each vapor-deposited aluminum layer preferably has a thickness about 0.05 $\mu m$ to about 0.07 $\mu m$.

Figure 1:
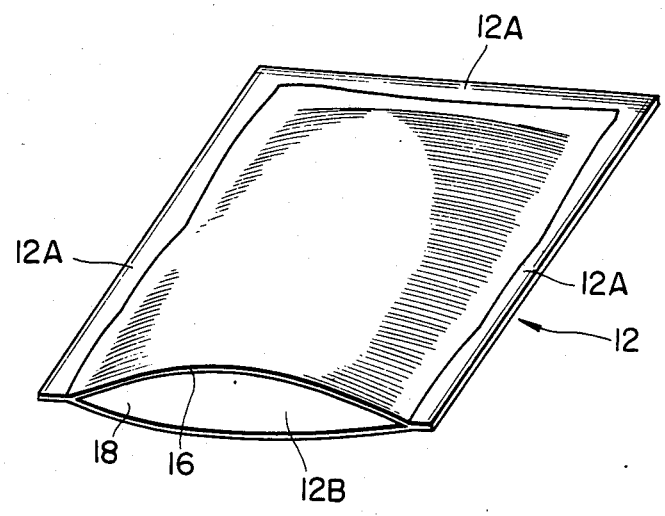
FIG. 1 is a perspective view of a bag for an insulation unit according to the present invention.

These films 16 and 18 are sealed at their three sides 12A by a conventional manner such as heat sealing to form a bag 12 with one open end 12B as illustrated in FIG. 1 and then a heat insulating material 14 is charged into it through the open end 12B. Then, the bag 12 is placed within a conventional vacuum packer for evacuation, during which the open end 12B of the bag 12 is sealed likewise. Thus, the insulation unit 10 as shown in FIG. 2 is produced, having sealed portions 12C of the bag 12 placed at peripheries thereof. The central portions of the films 16 and 18 define the planar portion A of the insulation unit 10.

With such a construction, the insulation unit 10 does not produce any heat bridge between the films 16 and 18 since only one film 16 has a metallic foil 22. Thus, heat flows between the films 16 and 18 at a very small flow rate, resulting in a fairly small heat conductivity of the insulation unit 10.

The metallic foil 22 prevents gas permeation through the film 16 and thereby considerably reduces the gas permeation area of the vacuum packed bag 10 and hence the flow rate of the gas which permeates the bag. This maintains a predetermined vacuum degree in the interior of the unit 10 for a fairly long period of time and hence prolongs the life of the insulation unit 10. The metallic foil 22 is provided to the film 16 to extend to the edges thereof, and hence a continuous laminating process of the metallic foil 22 may be made. That is, a long metallic foil for the foil 22 may be continuously provided between two long sheets of films for the films 20 and 24 and laminated to them, after which the material thus laminated is cut to length to produce the film 16. This enables ease of fabrication of the film 16 and thus reduction in manufacturing cost of the bag 10. The metallic foil 22 is sandwiched between the films 20 and 24 and hence even if the metallic foil 22 is bonded to these films through an adhesive, in the use of the insulation unit 10 for a double walled portion of a refrigerator, the bonding of the metallic foil 22 is not deteriorated due to Freon gas produced from a foamed urethane, etc which is used for fixing the unit 10 to the double walled portion. Thus, refrigerators using the insulation unit 10 ensure a predetermined heat insulation performance for a fairly long period of time.

Figure 6:
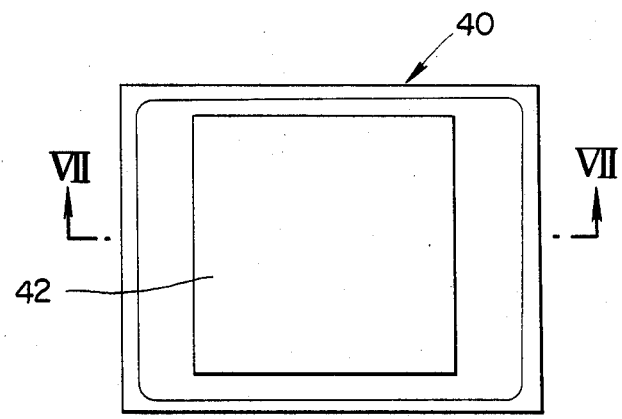
FIG. 6 is a plan view of a modified form of the insulation unit in FIG. 2.
Figure 7:
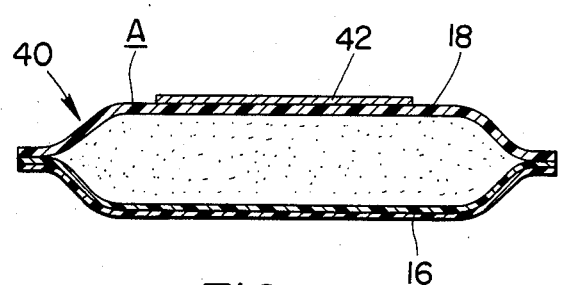
FIG. 7 is a cross-sectional view of the insulation unit along the line VII—VII in FIG. 6 with a modified scale.
Figure 8:
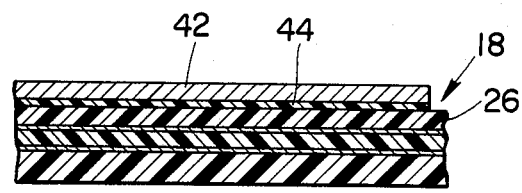
FIG. 8 is an enlarged cross-sectional view of part of the aluminum vapor-deposited film in FIG. 7, having an aluminum foil bonded to it.

FIGS. 6 to 8 illustrate a modified form of the present invention, with an improved heat insulation property. In FIGS. 6 to 8, parts similar to parts of the embodiment in FIGS. 1 to 5 are designated by like reference characters and explanations thereof are omitted. The modified insulation unit 40 is distinct from the insulation unit 10 in FIGS. 2 to 5 in that a metallic foil 42 is provided to the film 18. The metallic foil 42 is centrally bonded to the planar portion of the outer face of the film 18 through an adhesive 44, such as polyurethane adhesive, as shown in FIGS. 6 to 8. The metallic foil 42 may be attached to the film 18 by heat sealing and may be placed on the inner face of the film 18 or between the components of the film 18. The unit 40 of this modification is larger in metallic foil covered area than the unit 10 and hence has an improved gas impermeability, thus providing a superior performance in vacuum degree retention.

Figure 9:
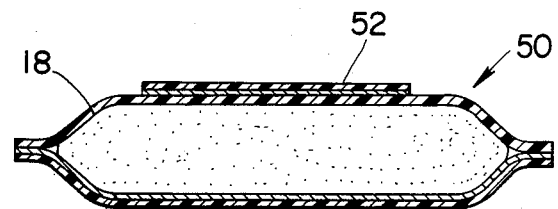
FIG. 9 is a cross-sectional view of a still modified form of the insulation unit in FIG. 2 with a modified scale.
Figure 10:
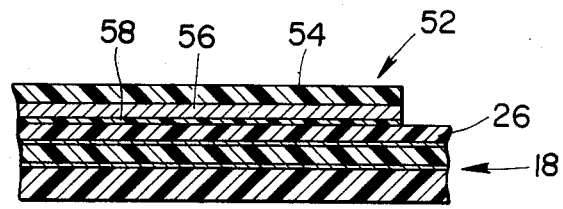
FIG. 10 is an enlarged cross-sectional view of part of the aluminum vapor-deposited film in FIG. 9 having an aluminum foil laminated film bonded to it.

In FIGS. 9 and 10, there is illustrated a still modified form of the insulation unit 10 in FIGS. 2 to 5. This modified insulation unit 50 has the same structure as the unit 10 except that a metallic foil laminated film 52 is attached to the aluminum vapor-deposited film 18 instead of the metallic foil 42 in the insulation unit 40 in FIGS. 6 to 8. The metallic foil laminated film 52 includes a protection layer 54 and a metallic foil 56 which is laminated at its one face to the protection layer 54 for protection. The metallic foil laminated film 52 is attached to the film 18 by laminating the other face of the metallic foil 56 to the outermost film layer 26 of the film 18 through an adhesive compound 58 such as acrylic adhesive compound. The metallic foil 56 may be laminated to the outermost film layer 26 through a conventional adhesive for dry laminating, such as polyurethane adhesive. The protection layer 54 may be made of the same film as the outermost layer 26 of the film 18 of the insulation unit 10. When the insulation unit 50 is used in a solvent such as Freon, it is preferable to adopt lamination of the metallic foil 56 through an adhesive rather than through adhesive compound. It is preferable to apply the metallic foil laminated film 52 over only a portion of the unit 50 which effectively contributes to heat insulation of the unit 50, thus preventing the unit 50 from degrading in heat insulation property.

EXAMPLES 1 and 2

There were prepared two bags 400 mm wide and 400 mm long. One bag (Example 1) used an aluminum foil laminated film and an aluminum vapor-deposited film heat sealed to the aluminum laminated film as in FIG. 1. The aluminum foil laminated film had the same structure as the film 16 in FIG. 4, including a 12 $\mu m$ PET outer layer having 500 Å aluminum vapor-deposited, 9 $\mu m$ aluminum foil heat sealed to the outer layer, and a 60 $\mu m$ HDPE inner layer heat sealed to the aluminum foil. The aluminum vapor-deposited film had the same structure as the film 18 in FIG. 5, including a 12 $\mu m$ PET outer layer having 500 Å aluminum film vapor deposited, a 12 $\mu m$ PET intermediate layer heat sealed to the outer layer and having 500 Å aluminum film vapor deposited and a 60 $\mu m$ HDPE inner layer heat sealed to the intermediate layer. The other bag (Example 2) had the same structure as the one bag except that another aluminum foil laminated film was laminated over the aluminum vapor-deposited film in 70% area thereof as in FIG. 9 through a polyurethane adhesive manufactured and sold by Takeda Yakuhin K. K., Japan under product designation "Takerakku A310" (hereinafter referred to as "Takerakku"). The another aluminum foil laminated film included a 12 $\mu m$ protection layer of PET and a 9 $\mu m$ aluminum foil laminated to the protection layer through the adhesive "Takerakku". The aluminum foil of the another aluminum foil laminated film was laminated to the outer face of the aluminum vapor-deposited film.

Each bag thus prepared was subjected to a water-vapor permeability test in which the bag was placed in the atmosphere of 65% RH at 27° C. and a carbon dioxide permeability test in which the bag was placed in carbon dioxide atmosphere of 1.1 atm at 30° C. The results are given in Table 1. It was noted that the water-vapor permeability and the carbon dioxide permeability of the bag of Example 2 was about ⅓ of those of the bag of Example 1. It is presumed that an insulation unit using the bag of Example 2 will be three times in life as long as an insulation unit using the bag of Example 1. In other words, it is presumed that the former will necessitate an adsorbent, which is contained in it for adsorbing gases entering through the bag films, in an amount about a third as much as the latter for the equal length of life, thus being less expensive than the latter.

COMPARATIVE EXAMPLE

A bag having the same size as the bags of the Examples 1 and 2 was prepared. This bag used two aluminum vapor-deposited films heat sealed to each other as in FIG. 1, the vapor-deposited films having the same structure as the aluminum vapor-deposited film of Example 1 and using the same materials as the latter. The bag was subjected to the same tests as the bags of Examples 1 and 2. The results are also given in Table 1. It was noted that with respect to water-vapor permeability and carbon dioxide permeability, the bag of Comparative Example was two times as large as the bag of Example 1 and about five or six times as large as the bag of Example 2.

TABLE 1

|  | Example | | Comparative |
| --- | --- | --- | --- |
|  | 1 | 2 | Example |
| Water-vapor permeability ($g/m^2 \cdot day$) | 0.08 | 0.03 | 0.16 |
| Carbon dioxide permeability ($cc/m^2 \cdot day\ atm$) | 0.5 | 0.15 | 1.0 |

What is claimed is:

1. A plate like insulation unit which includes an evacuated bag having two gas impermeable films sealed at peripheries thereof to form the bag and a heat insulating core material charged into the bag, the improvement wherein one said gas impermeable film is a first film comprising a metallic foil laminated to a plastic layer to extend to the peripheries of the plastic layer, and wherein the other gas impermeable film is a second film comprising a metallic layer vapor deposited on a plastic layer, said vapor deposited metallic layer in the second film being thinner than the metallic foil in the first film.

2. An insulation unit as recited in claim 1 wherein said first film comprises: an inner plastic layer, said metallic foil being laminated at one face thereof to the inner layer; and an outer layer laminated to the other face of the metallic foil.

3. An insulation unit as recited in claim 1 wherein said other face of said metallic foil in the second film is laminated to an outer face of said planar portion of the second film.

4. An insulation unit as recited in claim 1, wherein the metallic foil in the first film has a thickness of 9–30 microns, and the vapor deposited metallic layer in the second film has a thickness of 0.05–0.07 microns.

5. In a plate like insulation unit which includes an evacuated bag having two gas impermeable films sealed at peripheries thereof to form the bag and a heat insulating core material charged into the bag, the improvement wherein one said gas impermeable film is a first film comprising an inner plastic layer, a metallic foil laminated on one face thereof to the inner plastic layer to extend to the peripheries of the inner plastic layer, and an outer layer laminated to the other face of the metallic foil, and wherein the other gas impermeable film is a second film comprising a metallic layer vapor deposited on a plastic layer, a metallic foil, and a protection layer laminated to one face of the metallic foil in the second film, the metallic foil in the second film being laminated on the other face thereof to one face of said planar portion of the second film, the first and second films being sealed together at said peripheral portions.

* * * * *